Sept. 12, 1967        G. J. KONUCIK        3,340,626
SNOW CRUSHER AND THROWER
Filed March 4, 1964
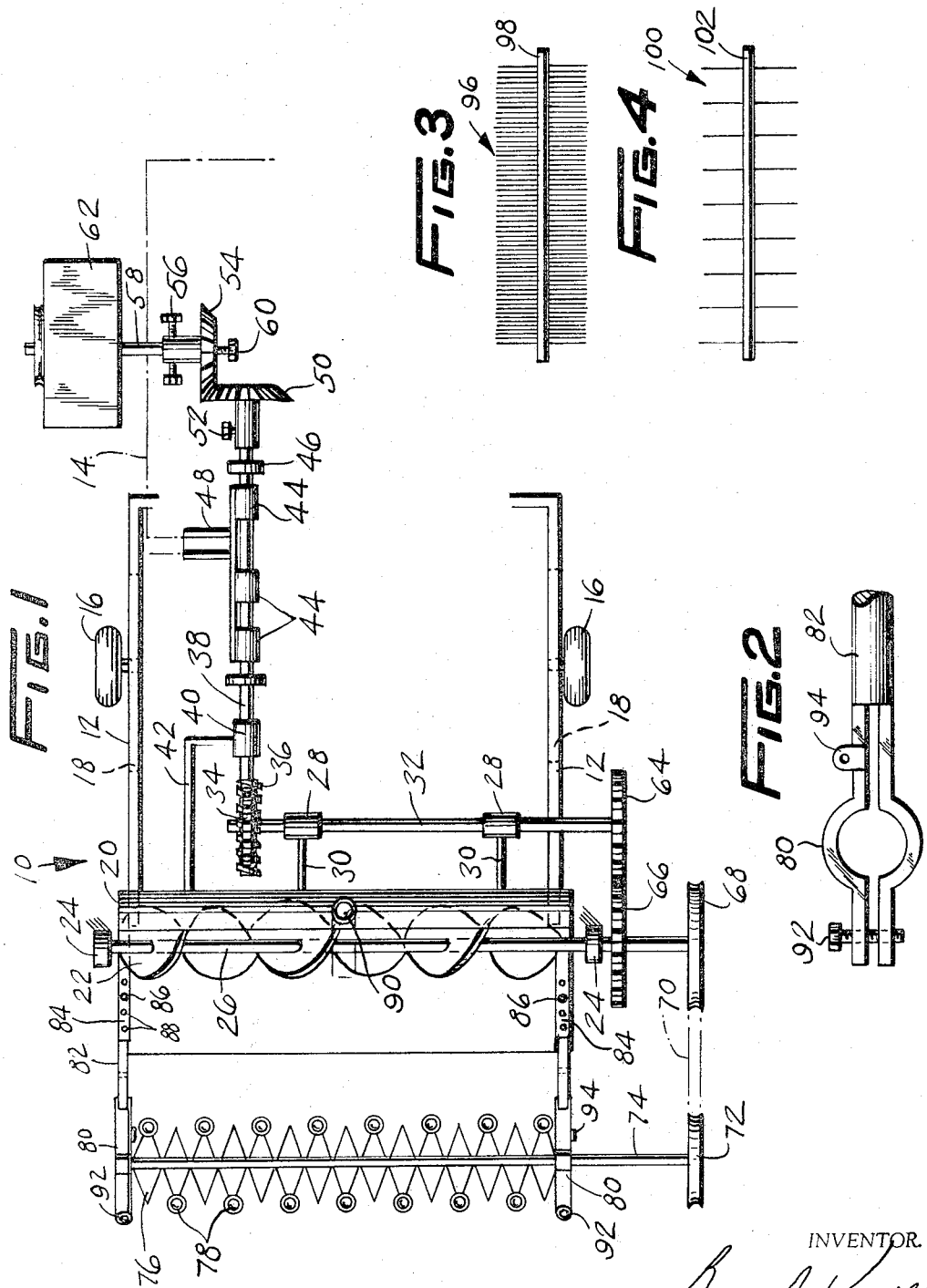
INVENTOR.
George J. Konucik

3,340,626
SNOW CRUSHER AND THROWER
George J. Konucik, Wildwood, Ill.
(Rte. 1, Box 35, West Point, Va. 23181)
Filed Mar. 4, 1964, Ser. No. 349,415
1 Claim. (Cl. 37—43)

This invention relates to snow removal apparatus and more particularly to a snow crusher and thrower lawn mower attachment.

It is an object of the present invention to provide a snow crusher and thrower apparatus which will be attached to rotary lawn mowers, whether manually propelled or self-propelled to make the lawn mower a combination purpose apparatus.

Another object of the present invention is to provide a snow crusher and thrower which will remove hardened and crusted snow, will sweep snow, sweep lawns and aerate lawns, and will also serve to propel other external loads.

A further object of the present invention is to provide a snow crusher and thrower which will have means for interchanging units to be used for different purposes and will minimize the need for additional machinery and which will be especially useful to the home owner with limited storage space.

A still further object of the present invention is to provide a snow crusher and thrower which will efficiently remove ice.

Other objects of the invention are to provide a snow crusher and thrower bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a top plan view of the present invention;

FIGURE 2 is a fragmentary side view of the crusher shaft bearing shown in FIGURE 1;

FIGURE 3 is a horizontal view of a revolving snow sweeping attachment for the invention shown in elevation;

FIGURE 4 is a horizontal view of an aerating attachment for the invention; shown in elevation; and Referring now more in detail to the drawing, a snow crusher and thrower 10 made in accordance with the present invention is shown to include a pair of spaced apart, horizontal bars 12 which impart stabilization and connect the mower to the unit by mounting to the sides of the mower body 14. A pair of wheels 16 on bars 12 are adjustable within slots 18 of bars 12 so that they may be moved horizontally and vertically in order to properly adjust the mower and snow crusher apparatus for desired balance. Bars 12 are secured to the ends of snow hood 20 which freely and rotatably receives snow throwing auger 22. A pair of spaced apart bearings 24 are mounted on any well-known type of support carried on the ends of the hood and indicated, symbolically, by the group of lines, see FIG. 1, extending diagonally from the bearings 24. The bearings 24 receive an auger shaft 26 and provide support means for auger 22. A pair of bearings 28 are fixedly secured at right angles to a pair of spaced apart brackets 30. The other ends of brackets 30 secured to bearings 28 are fixedly secured to the rear of snow hood 20 and support bearings 28. An elongated shaft 32 is freely and rotatably received within bearings 28 and a gear 34 fixedly secured to one end of shaft 32 toothingly engages a worm gear 36 which is secured to an elongated shaft 38. Shaft 38 is freely and rotatably received within bearing 40 which is secured to an L-shaped bracket 42, the other end of bracket 42 being secured to the rear of snow hood 20. Drive shaft 38 is freely and rotatably received within a plurality of spaced apart bearings 44 which provides end support means for drive shaft 38. A pair of end plate adjustment stops 46 are received by drive shaft 38 and serve to reduce end play of drive shaft 38. A T-shaped connector bracket 48 is secured to bearings 44 and provides mounting means for bearings 44 to the body of mower 14. A bevel gear 50 is secured to drive shaft 38 by means of set screw 52 and bevel gear 50 toothingly engages at right angles a bevel gear 54 which is secured by a pair of set screws 56 to shaft 58 of lawn mower 14. Additional securing means for bevel gear 54 is provided for by a central set screw 60 which is received through the end of shaft 58. Shaft 58 extends from the existing lawn mower engine 62 which drives the components herein described. A spur gear 64 toothingly engages a spur gear 66 secured to auger shaft 26. Spur gear 64 is fixedly secured to the end of shaft 32 received within bearings 28 and shaft 32 drives auger shaft 26. A V-belt pulley 68 is secured to auger shaft 26 and is spaced apart from spur gear 66. Pulley 68 receives a belt 70 which is received around pulley 72 secured to shaft 74 and thus pulley 68, by means of auger shaft 26, rotates shaft 74 of the apparatus. A plurality of radial snow cutting blades 76, engaging snow in a broadside manner, are secured along the length of shaft 74 and a plurality of snow crusher cups 78 which are designed to rotatably crush snow are secured alternately to the apex of the triangularly-configurated snow cutting blades 76. Secured to each side edge of hood 20 is an extension member which extends forwardly of the hood in parallel relation to the side bars. Each of the extension members consists of a tubular member which is secured to the hood 20 and a rod 82 telescopically received in the tubular member. The rod 82 is secured in the tubular member by a screw 86 which can be placed in any one of a plurality of spaced holes 88. Each rod 82 terminates in a split bearing, see FIG. 2, which receives one end of shaft 74. The upper portion 80 of the split bearing is hinged to a lug 94 and is normally clamped to the lower portion of the bearing by screw 92. Removing or loosening screw 92 permits the insertion and removal of shaft 74 from the bearing. An angular snow discharge chute 90 extends from snow hood 20 and provides a means for discharging snow away from the apparatus.

An elongated snow sweeping brush 96 is provided with a shaft 98 which may be used within bearing 80, and a wire bristle brush 100 is provided with a central shaft 102 which may be received within bearings 80, and brush 100 is an aerating attachment for snow crusher and thrower 10.

In operation, gear 54 which is secured to shaft 58 of engine 62 of the lawn mower rotates gear 50 on shaft 38 which, by means of worm gear 36, rotates gear 34 which rotates shaft 32. Gear 64, secured to shaft 32, in turn rotates gear 66 which is secured to auger shaft 26. Pulley 68, secured to auger shaft 26, rotates pulley 72 by means of belt 70, and the pulley 72 is secured to and rotates shaft 74.

It shall be noted that shaft 74 having crusher cups 78 and snow cutting blades 76 is normally used together with auger 22, especially when there is a hardened snow formation. The snow when broken up enters snow hood 20 where rotating auger 22 transports the snow to discharge sheet 90 whereupon it is expelled from the present apparatus.

It shall further be noted that auger 22 may be removed from the present invention by the removal of nuts and bolts (not shown).

Snow crusher 10 has a secondary advantage, in that the use of the mower with the snow crusher apparatus secured to it will keep the engine of the device always ready for use. The carburetor of mowers during the period of inactivity in winter time tend to gum up because of certain chemicals in the gasoline, and with all year round use, such as the hereindesecribed combination presents, will prevent the formation of gum within the carburetor.

While various changes may be made in the detail construction, it shall be understood that such changes shall be within the spirit and scope of the present invention as defined by the appended claim.

What I claim as new and desire to protect by Letters Patent of the United States is:

A snow crusher and thrower comprising, in combination, a pair of spaced-apart, horizontally disposed bars for securing said snow crusher and thrower to a conventional lawn mower which includes a power unit, said bars extending forwardly of the mower when attached thereto, a wheel rotatably secured on each of said bars, a snow hood secured adjacent its ends to the free ends of said bars in perpendicular relationship thereto, a bearing secured at each end of said hood, a shaft within said hood and rotatably secured in said bearings, an auger means mounted on said shaft within said hood, said auger means serving, when rotated to convey snow to a central portion of said hood, said auger means including an impeller means at a central portion thereof, a spur gear and a V-belt pulley mounted on a free end of said shaft exteriorly of said hood, a pair of spaced-apart brackets affixed to the exterior of said hood and extending rearwardly therefrom in parallel relationship to said bars, a bearing unit secured to the free end of each of said brackets, a second shaft rotatably received within said bearing units in parallel with said first mentioned shaft, means operatively connecting said second shaft with said power unit for rotation of said second shaft, a spur gear mounted on a free end of said second shaft for engagement with said first mentioned spur gear, a pair of spaced-apart support rods extending forwardly from the ends of said hood in substantially parallel relationship to said bars, said support rods each including a bearing unit, a third shaft rotatably received within said last mentioned bearing units in parallel with said first mentioned shaft, a pulley mounted on a free end portion of said third shaft in alignment with said first mentioned pulley, an endless belt received on said pulleys, a plurality of uniformly disposed cutting blades secured to said third shaft for cutting and loosening snow, a plurality of crusher elements secured to the outermost portions of alternative cutting blades for crushing and pulverizing snow, and a discharge chute secured to the central portion of said hood to receive snow discharged by said impeller means.

References Cited

UNITED STATES PATENTS

| | | | |
|---|---|---|---|
| 1,923,444 | 8/1933 | La Clair | 37—43 |
| 2,032,777 | 3/1936 | Thomas | 56—249 |
| 2,116,945 | 5/1938 | Hitchens | 37—43 |
| 2,482,213 | 9/1949 | Ritchie | 37—43 |
| 2,712,211 | 7/1955 | Smith et al. | |
| 3,086,789 | 4/1963 | Kleiman | 37—43 X |
| 3,131,491 | 5/1964 | Durrschmidt | 37—43 |

ABRAHAM G. STONE, *Primary Examiner.*

R. L. HOLLISTER, *Assistant Examiner.*